US010821982B2

(12) United States Patent
Carlson et al.

(10) Patent No.: US 10,821,982 B2
(45) Date of Patent: Nov. 3, 2020

(54) SYSTEM AND METHOD FOR ADJUSTING TORQUE LIMITS FOR A WORK VEHICLE

(71) Applicant: CNH Industrial America LLC, New Holland, PA (US)

(72) Inventors: Nathan James Carlson, West Fargo, ND (US); Jonathan Lacher, South Fargo, ND (US); Paul E. Wibbels, West Fargo, ND (US); Jerry Brinkley, Woodridge, IL (US)

(73) Assignee: CNH Industrial America LLC, New Holland, PA (US)

( * ) Notice: Subject to any disclaimer, the term of this patent is extended or adjusted under 35 U.S.C. 154(b) by 163 days.

(21) Appl. No.: 16/135,803

(22) Filed: Sep. 19, 2018

(65) Prior Publication Data

US 2019/0084568 A1 Mar. 21, 2019

Related U.S. Application Data

(60) Provisional application No. 62/561,288, filed on Sep. 21, 2017.

(51) Int. Cl.
*F16H 61/472* (2010.01)
*B60W 30/188* (2012.01)
(Continued)

(52) U.S. Cl.
CPC .... *B60W 30/1846* (2013.01); *B60W 30/1882* (2013.01); *E02F 9/2246* (2013.01);
(Continued)

(58) Field of Classification Search
CPC .............. F02D 2250/18; F02D 2250/26; E02F 9/2246; F16H 61/472; B60W 30/1882
See application file for complete search history.

(56) References Cited

U.S. PATENT DOCUMENTS 7,512,471 B2 * 3/2009 Nakamura ............ B60W 10/06
60/443
2009/0036270 A1 2/2009 Hayashi et al.
(Continued)

FOREIGN PATENT DOCUMENTS

DE 10 2013 209086 12/2013
EP 1655469 5/2006
WO WO 2013/029636 3/2013

OTHER PUBLICATIONS

International Search Report and Written Opinion of the International Searching Authority, PCT Application No. PCT/US2018/051741, dated Dec. 10, 2018 (14 pages).

*Primary Examiner* — Tisha D Lewis
(74) *Attorney, Agent, or Firm* — Rickard K. DeMille; Rebecca L. Henkel

(57) ABSTRACT

In one aspect, a method for adjusting torque limits for a work vehicle may include controlling, with a computing device, an operation of an engine of the work vehicle such that a torque output of the engine is maintained at or below a baseline engine torque limit. The method may also include receiving, with the computing device, an input associated with a current hydraulic power requirement of a hydraulic system of the work vehicle, and adjusting, with the computing device, a torque limit for the engine from the baseline engine torque limit to an adjusted engine torque limit based on the current hydraulic power requirement of the hydraulic system. In addition, the method may include controlling, with the computing device, the operation of the engine such that the torque output of the engine is maintained at or below the adjusted engine torque limit.

17 Claims, 3 Drawing Sheets

(51) Int. Cl.
*B60W 30/184* (2012.01)
*F16H 61/478* (2010.01)
*F02D 41/14* (2006.01)
*F02D 41/02* (2006.01)
*E02F 9/22* (2006.01)
*F16H 63/50* (2006.01)
*F02D 29/04* (2006.01)

(52) U.S. Cl.
CPC ....... *F02D 41/021* (2013.01); *F02D 41/1497* (2013.01); *F16H 61/478* (2013.01); *B60W 2710/0666* (2013.01); *B60W 2710/105* (2013.01); *B60Y 2200/41* (2013.01); *F02D 29/04* (2013.01); *F02D 2250/26* (2013.01); *F16H 2063/504* (2013.01)

(56) References Cited

U.S. PATENT DOCUMENTS

| | | | |
|---|---|---|---|
| 2009/0240404 A1 | 9/2009 | Matsuyawa | |
| 2012/0279203 A1* | 11/2012 | Arai | F02D 41/1448 60/276 |
| 2013/0239558 A1* | 9/2013 | Shirao | E02F 9/2253 60/327 |
| 2015/0225927 A1* | 8/2015 | Hoshino | B60K 6/485 701/50 |

* cited by examiner

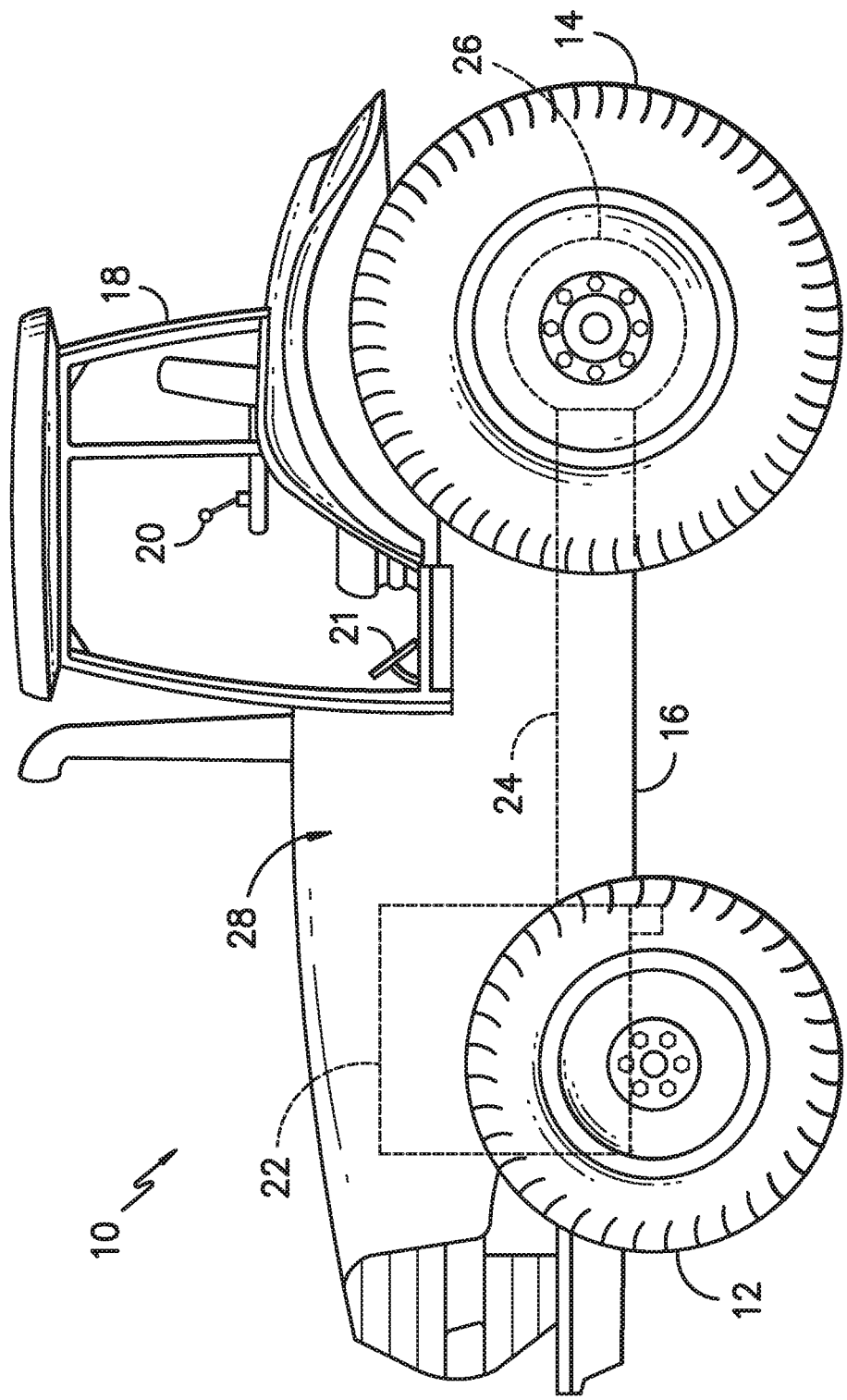
FIG. -1-

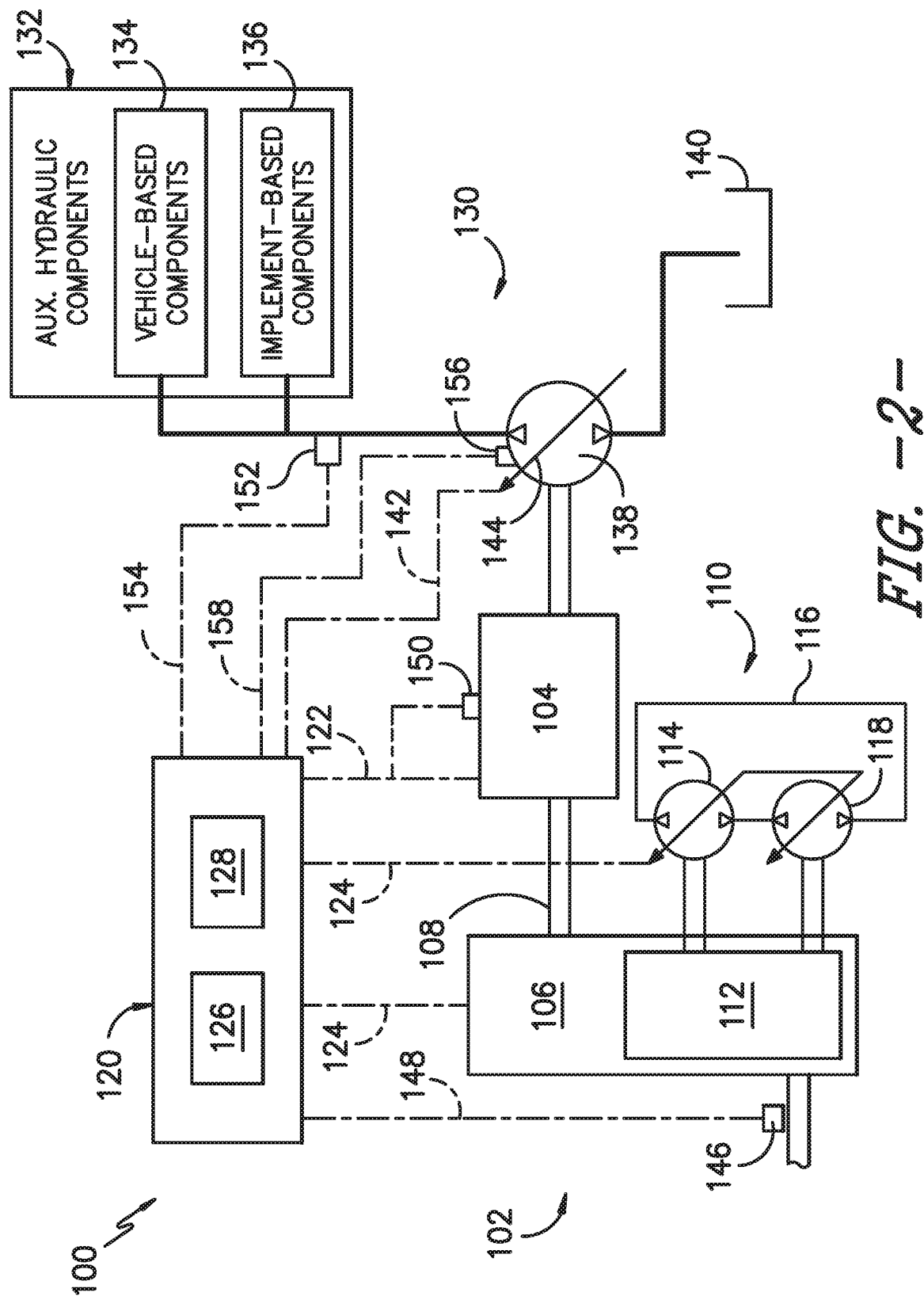
FIG. -2-

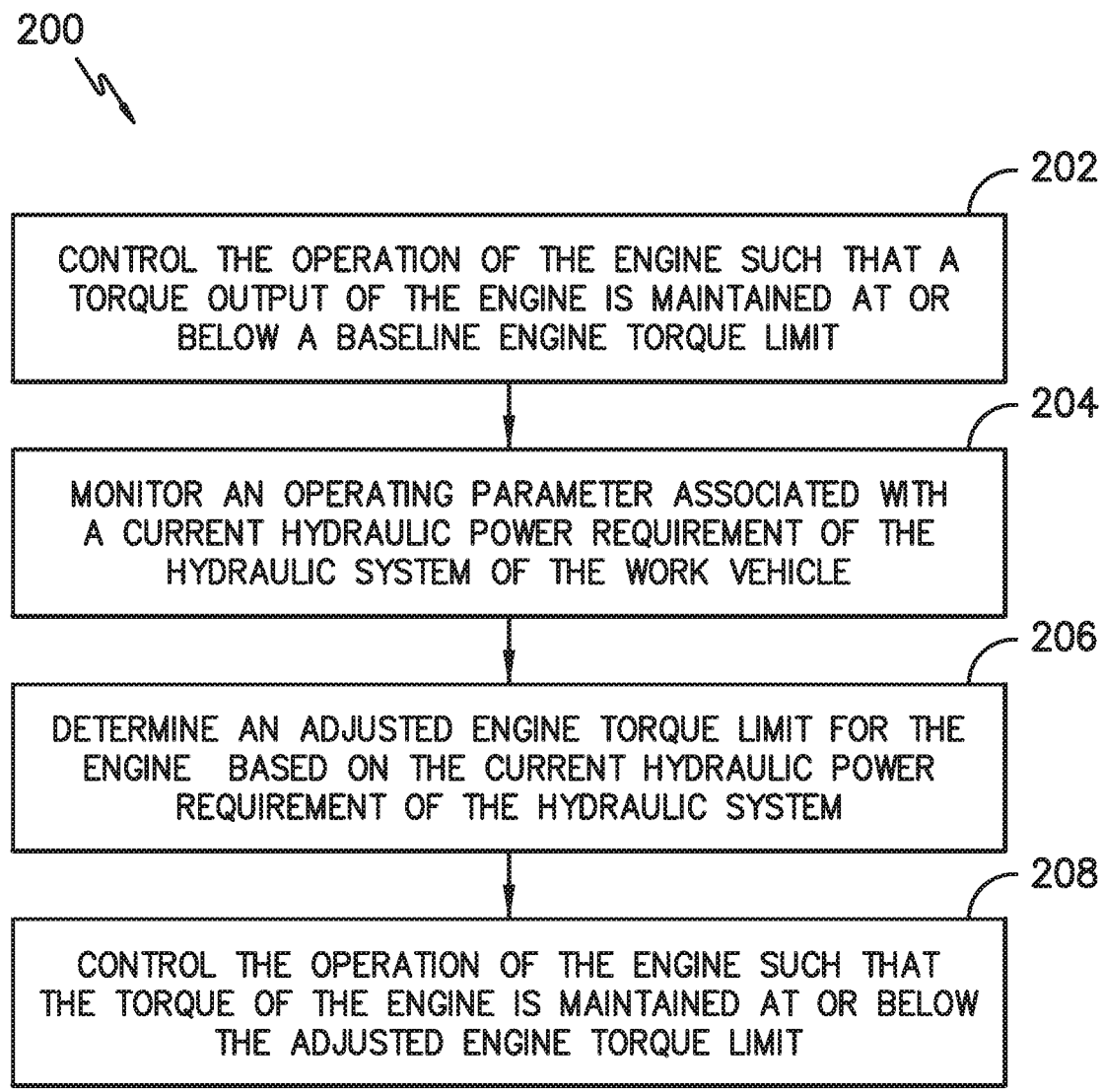
FIG. -3-

SYSTEM AND METHOD FOR ADJUSTING TORQUE LIMITS FOR A WORK VEHICLE

FIELD OF THE INVENTION

The present subject matter relates generally to torque limits for work vehicles and, more particularly, to a system and method for adjusting engine torque limits for a work vehicle based on the current hydraulic power requirements of the vehicle's hydraulic system.

BACKGROUND OF THE INVENTION

Work vehicles, such as tractors and other agricultural vehicles, include an engine and a transmission, such as a power shift transmission (PST) or a continuously variable transmission (CVT), rotatably coupled to the engine. In addition, work vehicles typically include an electronic controller that is configured to control the operation of the engine and the transmission to achieve desired operation. For example, an operator may provide an input to the controller selecting a desired ground speed for the work vehicle. Based on the operator input, the controller may be configured to automatically control the operation of the engine and/or the transmission such that the actual speed of the work vehicle matches the desired speed selected by the operator. Additionally, by including an electronically controlled engine, the torque available from the engine may be controlled accurately. As a result, manufacturers have attempted to protect the drivetrain components of the work vehicle by defining specific torque limits for the engine, which in turn, provides corresponding output torque limits for the transmission. Currently, such torque limits have been implemented by defining a fixed engine torque limit for each gear ratio of the transmission (e.g., for power shaft transmissions) or for specific speed ranges of the work vehicle (e.g., for continuously variable transmissions).

Typically, for a work vehicle, the primary power consumers of engine power are the drivetrain components for transferring power from the engine to the vehicle's wheels as well as the various hydraulic system components used for operating one or more power-consuming hydraulic accessories or components of the work vehicle and/or an implement being towed by the vehicle. As a result, when engine torque is being limited via an applicable engine torque limit and a significant amount of engine power is being consumed by one or more hydraulic components, the engine power available for transfer through the drivetrain components is often substantially reduced, thereby impacting the vehicle's overall performance and reducing operator satisfaction. For instance, many of the implements configured to be towed by a work vehicle include hydraulic components with significantly high hydraulic loads (e.g., the hydraulic fan(s) of an air seeder). In such instance, the engine power consumed by such implemented-based hydraulic accessories may significantly limit the remaining engine power available to be used by the drivetrain when the engine is operating at or near its preset engine torque limits.

Accordingly, an improved system and method for adjusting engine torque limits for a work vehicle based on the vehicle's current hydraulic power requirements to allow additional engine power to be available for transfer through the vehicle's drivetrain would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for adjusting torque limits for a work vehicle. The method may include controlling, with a computing device, an operation of an engine of the work vehicle such that a torque output of the engine is maintained at or below a baseline engine torque limit and monitoring, with the computing device, an operating parameter associated with a current hydraulic power requirement of a hydraulic system of the work vehicle. The method may also include determining, with the computing device, an adjusted engine torque limit for the engine based on the current hydraulic power requirement of the hydraulic system, with the adjusted engine torque limit differing from the baseline engine torque limit. In addition, the method may include controlling, with the computing device, the operation of the engine such that the torque output of the engine is maintained at or below the adjusted engine torque limit.

In another aspect, the present subject matter is directed to a system for adjusting torque limits for a work vehicle. The system may include an engine, a transmission operatively coupled to the engine and a hydraulic system including a hydraulic pump. The hydraulic pump may be configured to supply pressurized hydraulic fluid to one or more auxiliary hydraulic components. The system may also include a controller having a processor and associated memory. The memory may store instructions that, when implemented by the processor, configure the controller to control an operation of the engine such that a torque output of the engine is maintained at or below a baseline engine torque limit, monitor an operating parameter associated with a current hydraulic power requirement of the hydraulic system, and determine an adjusted engine torque limit for the engine based on the current hydraulic power requirement of the hydraulic system, with the adjusted engine torque limit differing from the baseline engine torque limit. In addition, the controller may be configured to control the operation of the engine such that the torque output of the engine is maintained at or below the adjusted engine torque limit.

In yet another aspect, the present subject matter is directed to a method for adjusting torque limits for a work vehicle. The method may include controlling, with a computing device, an operation of an engine of the work vehicle such that a torque output of the engine is maintained at or below a baseline engine torque limit. The method may also include receiving, with the computing device, an input associated with a current hydraulic power requirement of a hydraulic system of the work vehicle, and adjusting, with the computing device, a torque limit for the engine from the baseline engine torque limit to an adjusted engine torque limit based on the current hydraulic power requirement of the hydraulic system. In addition, the method may include controlling, with the computing device, the operation of the engine such that the torque output of the engine is maintained at or below the adjusted engine torque limit.

In an even further aspect, the present subject matter is directed to system for adjusting torque limits for a work vehicle. The system may include an engine, a transmission operatively coupled to the engine and a hydraulic system including a hydraulic pump. The hydraulic pump may be configured to supply pressurized hydraulic fluid to one or more auxiliary hydraulic components. The system may also include a controller having a processor and associated memory. The memory may store instructions that, when implemented by the processor, configure the controller to control an operation of the engine such that a torque output of the engine is maintained at or below a baseline engine torque limit, and receive an input associated with a current hydraulic power requirement of the hydraulic system. The controller may also be configured to adjust a torque limit for the engine from the baseline engine torque limit to an adjusted engine torque limit based on the current hydraulic power requirement of the hydraulic system, and control the operation of the engine such that the torque output of the engine is maintained at or below the adjusted engine torque limit.

In another aspect, the present subject matter is directed to a method for controlling the operation of a work vehicle. The method may include controlling, with a computing device, an operation of an engine of the work vehicle such that a first amount of engine power is available for transmission through a drivetrain of the work vehicle. The method may also include determining, with the computing device, that a hydraulic power requirement for a hydraulic system of the work vehicle has increased, and adjusting, with the computing device, the control of the operation of the engine such that a second amount of engine power is available for transmission through the drivetrain, the second amount of engine power being greater than the first amount of engine power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a system for adjusting torque limits for a work vehicle in accordance with aspects of the present subject matter; and FIG. 3 illustrates a flow diagram of one embodiment of a method for adjusting torque limits for a work vehicle in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for adjusting torque limits for a work vehicle. Specifically, in several embodiments, the disclosed system may be configured to adjust the engine torque limits associated with limiting the torque output of the engine based on the current power usage or hydraulic power requirement of the vehicle's hydraulic system. For example, as will be described below, as the hydraulic power usage increases, the applicable engine torque limit may be similarly increased. As a result, the amount of engine power available to be used by the vehicle's drivetrain may be increased to account for the engine power being consumed by the hydraulic system.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various input devices, such as a control lever 20 and/or a foot pedal 21, for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a drive axle assembly 26. The engine 22, transmission 24, and drive axle assembly 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a tillage implement, air seeder, planter, spray boom, and/or the like.

Referring now to FIG. 2, a schematic, simplified view of one embodiment of a system 100 for adjusting the torque limits of a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicle to allow for the vehicle's torque limits to be adjusted or modified. Additionally, it should be appreciated that hydraulic or fluid couplings of the system 100 shown in FIG. 2 are indicated by bold lines. Similarly, communicative links or electrical couplings of the system 100 shown in FIG. 2 are indicated by phantom lines.

As shown in FIG. 2, in several embodiments, the system 100 may include one or more components of a drivetrain 102 for transferring engine power to the front and/or rear wheels 12, 14 for driving the work vehicle 10. In several embodiments, the drivetrain 102 may generally include an engine 104 (e.g., engine 22 shown in FIG. 1) and a transmission 106 (e.g., transmission 24 shown in FIG. 1) configured to be mounted on the chassis 16 (FIG. 1) of the work vehicle 10. In one embodiment, the transmission 106 may be operably coupled to the engine 104 via one or more output shafts 108.

It should be appreciated that, in the illustrated embodiment, the transmission 106 is configured as a continuously variable transmission (CVT). In such an embodiment, the transmission 106 may include both a hydrostatic drive unit 110 and a planetary gear unit 112 configured to be driven by the engine 104 via one or more shafts and associated gears. As shown in FIG. 2, the hydrostatic drive unit 110 may generally include a hydraulic pump 114 coupled by fluid conduits 116 in a closed fluid loop to a corresponding hydraulic motor 118, with the hydraulic pump 114 and hydraulic motor 118 both corresponding to electronically controlled components configured to be controlled automatically via a controller of the system 100 (e.g., the controller 120 described below). However, in other embodiments, the transmission 106 may have any other suitable configuration. For example, in an alternative embodiment, the transmission 106 may be configured as a power shift transmission (PST).

In addition, the system 100 may include a controller 120 configured to control the operation of one or more components of the work vehicle 10, such as the engine 104 and the transmission 106. For example, the controller 120 may be communicatively coupled to one or more components of the engine 104 (e.g., an engine governor or engine control unit (ECU) (not shown)) via one or more communicative links 122 in order to control the operation of the engine 104 and/or monitor the speed and/or torque output of the engine 104. Similarly, the controller 120 may be communicatively coupled to one or more transmission components via one or more communicative links 124 to control the operation of the transmission 106. For instance, the controller 120 may be configured to transmit suitable current commands via communicative link(s) 124 to one or more clutch valves (not shown) to control the engagement/disengagement of one or more clutches (not shown) of the transmission 106 and/or to the hydrostatic drive unit 110 to control the operation of the hydraulic pump 114 and/or the hydraulic motor 118

It should be appreciated the controller 120 may generally comprise any suitable processor-based device known in the art, such as one or more computing devices. Thus, in several embodiments, the controller 120 may include one or more processor(s) 126 and associated memory device(s) 128 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 128 of the controller 120 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 128 may generally be configured to store suitable computer-readable instructions that, when implemented by the processor(s) 126, configure the controller 120 to perform various computer-implemented functions, such as performing the various calculations described herein and/or implementing one or more aspects of the method 200 described below with reference to FIG. 3. In addition, the controller 120 may also include various other suitable components, such as a communications circuit or module, one or more input/output channels, a data/control bus and/or the like.

It should also be appreciated that the controller 120 may correspond to an existing controller of the work vehicle 10 (e.g., an existing engine and/or transmission controller) or the controller 120 may correspond to a separate controller. For instance, in one embodiment, the controller 120 may form all or part of a separate plug-in module that may be installed within the work vehicle 10 to allow for the disclosed system and method to be implemented without requiring additional software to be uploaded onto existing control devices of the vehicle 10.

As indicated above, in several embodiments, the controller 120 may be configured to control the operation of the engine 104 based on one or more engine torque limits. For instance, in several embodiments, a plurality of baseline engine torque limits may be stored within the controller's memory 128 for limiting the torque output of the engine 104 based on the current gear ratio of the transmission 106 and/or based on the current speed of the work vehicle 10. For example, when the transmission 106 corresponds to a CVT, the controller 120 may include a plurality of speed-based engine torque limits stored within its memory 128, with each engine torque limit corresponding to a predetermined torque limit for a respective speed range of the work vehicle 10. Alternatively, when the transmission 106 corresponds to a PST, the controller 102 may include a plurality of gear-based engine torque limits stored within its memory 128, with each engine torque limit corresponding to a predetermined torque limit for a respective gear ratio of the transmission 106. Regardless, the baseline engine torque limits may generally correspond to the same or similar torque limits typically selected for limiting the output torque of the engine 104 so as to prevent damage to one or more of the drivetrain components due to excessive torque. As will be described below, in accordance with aspects of the present subject matter, the controller 120 may be configured to modify or adjust the baseline engine torque limit currently being applied for controlling the engine 104 (e.g., as selected based on the current vehicle speed or the current transmission ratio) when a portion of the engine power is being consumed by one or more non-drivetrain components, such as one or more hydraulic system components, to allow additional engine power to be available for transfer through the drivetrain 102.

As shown in FIG. 2, the system 100 may also include a hydraulic system 130 for supplying pressurized hydraulic fluid to one or more auxiliary hydraulic components 132. As used herein, the term "auxiliary hydraulic component" generally refers to any power-consuming hydraulic component that is not used for transferring power through the vehicle's drivetrain 102. Thus, in several embodiments, the auxiliary hydraulic components 132 may include one or more hydraulic components or accessories of the work vehicle 10, such as one or more onboard hydraulic cylinders and/or the like (e.g., as indicated by box 134 in FIG. 2). In addition, the auxiliary hydraulic components 132 may also include one or more other hydraulic components or accessories configured to be supplied with pressurized hydraulic fluid from the vehicle's hydraulic system 130, including any hydraulic components located remote to the work vehicle 10 that are hydraulically coupled to the hydraulic system 130. For instance, as shown in FIG. 2, the auxiliary hydraulic components 132 may include one or more hydraulic components or accessories of an implement being pulled or towed by the work vehicle 10 (e.g., as indicated by box 136 in FIG. 2). As indicated above, such implement-based hydraulic components may often impose significant hydraulic loads on the system 100 and, thus, may correspond to heavy consumers of engine power. For example, the hydraulic fans used within air seeders typically have a substantial hydraulic power requirement.

As shown in FIG. 2, in several embodiments, the hydraulic system 130 may include one or more hydraulic pumps 138 for controlling the flow of hydraulic fluid from a fluid tank 140 of the work vehicle 10 to each auxiliary hydraulic component 132. In general, the hydraulic pump(s) 138 may be configured to be directly or indirectly rotationally coupled to the engine 104. For instance, as shown in the illustrated embodiment, the hydraulic pump(s) 138 may be driven directly via an output of the engine 104. Alternatively, the hydraulic pump(s) 138 may be indirectly rotationally coupled to the engine 104, such as by driving the pump(s) 138 off of the transmission 106. Regardless, the engine power consumed by the hydraulic pump(s) 138 may be proportional to the hydraulic load requirements of the various auxiliary hydraulic components 132. As shown, the controller 120 may be communicatively coupled to the hydraulic pump(s) 138 (e.g., via communicative link 142) so that the angle of a swash plate of the hydraulic pump(s) 138 (the swash plate being denoted by diagonal arrow 144 through the pump 138) may be automatically adjusted to regulate the discharge flow rate of the pump 138. In one embodiment, the angle of the swash plate 144 may be adjusted via an associated actuator(s) (not shown) configured to be controlled by the controller 120.

In several embodiments, the controller 120 may be communicatively coupled to one or more sensors for monitoring one or more corresponding operational parameters of the vehicle's drivetrain 102. For instance, as shown in FIG. 2, the controller 120 may be communicatively coupled to one or more speed sensors 146 (e.g., via communicative link 148) configured to directly or indirectly detect the output speed of the transmission 106, thereby allowing the controller 120 to continuously monitor the transmission output speed via feedback from the sensor(s) 146. In addition, the controller 120 may be communicatively coupled to one or more engine sensors 150 configured to directly or indirectly detect the engine speed and/or the engine torque, thereby allowing the controller 120 to continuously monitor the operational parameters of the engine 104.

The controller 120 may also be communicatively coupled to one or more sensors for monitoring one or more operational parameters of the vehicle's hydraulic system 130. For instance, as shown in FIG. 2, the controller 120 may be communicatively coupled to one or more pressure sensors 152 (e.g., via communicative link 154) configured to directly or indirectly detect the fluid pressure of the hydraulic fluid supplied to the auxiliary hydraulic components 132. As such, the controller 120 may continuously monitor the discharge pressure of the pump(s) 138. Moreover, the controller 120 may also be communicatively coupled to one or more sensors 156 (e.g., via communicative link 158) configured to directly or indirectly detect the flow rate of the hydraulic fluid output from the pump(s) 138. For instance, in one embodiment, the sensor(s) 156 may correspond to one or more swash plate sensors configured to detect the position of the pump's swash plate, 144 which may provide an indication of the discharge flow of the pump(s) 138. As will be described below, by monitoring both the flow rate and the pressure of the hydraulic fluid output from the pump(s) 138, the controller 120 may be configured to calculate the hydraulic load or power requirement of the hydraulic system 130, which may then be used as a basis for modifying the baseline engine torque limits stored within the controller's memory 128.

As indicated above, the primary power consumers of a work vehicle 10 are typically the drive system components of the drivetrain 102 and the hydraulic system components (e.g., the hydraulic pump(s) 138). For example, the overall system power requirement for the work vehicle 10 may be generally expressed according the following equation (Equation 1):

$$P_{sys} = P_{drive} + P_{hyd} \quad (1)$$

wherein, $P_{sys}$ corresponds to the total system power requirement, $P_{drive}$ corresponds to the drive power requirement for achieving the desired ground speed of the work vehicle 10, and $P_{hyd}$ corresponds to the hydraulic power requirement for achieving the flow demand needed to operate the auxiliary hydraulic component(s) 132.

Based on the relationship of Equation (1), it should be readily appreciated that, when the hydraulic power requirement is relatively high and the engine 104 is operating at or near its baseline torque limit, the power available for transfer through the vehicle's drivetrain 102 may be significantly limited. As indicated above, the baseline engine torque limits are typically selected so as to prevent damage to the vehicle's drivetrain 102 due to excessive torque. However, such engine torque limits are applied regardless of whether all or a portion of the available engine power is being consumed by the drivetrain 102. As a result, when a substantial portion of the available engine power is consumed by the vehicle's hydraulic system 130 (thereby reducing the power available to the drivetrain 102), a significant amount of additional torque capacity exists for the drivetrain 102 that is not taken into account by the baseline engine torque limits. Thus, in accordance with aspects of the present subject matter, the disclosed system 100 may be configured to modify or adjust the baseline engine torque limits applied to control the operation of the engine 104 as a function of the current hydraulic power requirement for the hydraulic system 130. Specifically, as the hydraulic power usage increases, the applicable engine torque limit may be similarly increased. As a result, the amount of engine power available to be used by the drivetrain 102 may be increased to account for the engine power being consumed by the hydraulic system 130.

In several embodiments, the controller 120 of the disclosed system 100 may be configured to monitor one or more operating parameters of the vehicle's hydraulic system 130 to determine the current power usage or hydraulic power requirement of the hydraulic system 130. For instance, as indicated above, the controller 120 may be communicatively coupled to one or more sensors 152, 156 for monitoring both the fluid pressure and the flow rate of the hydraulic fluid supplied within the hydraulic system 130 via the pump(s) 138. Based on such monitored parameters, the controller 120 may then calculate the current power requirement for the hydraulic system 130. For instance, in one embodiment, the power requirement for the hydraulic system 130 may be expressed according to the following equation (Equation 2):

$$P_{hyd} = p_d * Q \quad (2)$$

wherein, $P_{hyd}$ corresponds to the hydraulic power requirement for the hydraulic system 130, $p_d$ corresponds to the discharge pressure for the hydraulic pump(s) 138, and Q corresponds to the flow rate of the hydraulic fluid output from the hydraulic pump(s) 138.

By continuously calculating the hydraulic power usage, the controller 120 may, in turn, determine the corresponding amount of engine torque required to output such power. For instance, the current hydraulic power requirement may be converted to an engine torque value based on the current engine speed, which may be considered the "hydraulics-based torque requirement" for satisfying the current power demand of the hydraulic system 130. This hydraulics-based torque requirement may then be used as basis for modifying or adjusting the predetermined or baseline torque limits for the engine 104. Specifically, when the hydraulic system 130 is consuming power from the engine 104, the controller 120 may be configured to calculate an adjusted engine torque limit by increasing the applicable baseline engine torque limit by a given torque amount determined as a function of the hydraulics-based torque requirement for satisfying the current power demands of the hydraulic system 130. For example, the controller 120 may calculate the adjusted engine torque limit according to the following equation (Equation 3):

$$TL_{adjust} = TL_{base} + T_{add} \quad (3)$$

wherein, $TL_{adjust}$ corresponds to the adjusted engine torque limit, $TL_{base}$ corresponds to the baseline engine torque limit, and $T_{add}$ corresponds to the torque value to be added to the baseline engine torque limit as determined as a function of the current hydraulics-based torque requirement.

It should be appreciated that, in several embodiments, the specific amount of torque ($T_{add}$) added to the baseline engine torque limit may correspond to a predetermined percentage of the engine torque required to satisfy the current power demands of the hydraulic system 130. For instance, in one embodiment, the baseline engine torque limit may be increased by a torque amount ranging from about 75% of the current hydraulics-based torque requirement to about 125% of the current hydraulics-based torque requirement, such as from about 80% of the current hydraulics-based torque requirement to about 120% of the current hydraulics-based torque requirement or from about 90% of the current hydraulics-based torque requirement to about 110% of the current hydraulics-based torque requirement, and/or any other subranges therebetween. In such an embodiment, the engine power available to be used by the vehicle's drivetrain 102 may be increased by an amount proportional to the amount of engine power currently being consumed by the hydraulic system 130. For instance, if the baseline engine torque limit is increased by a torque amount corresponding to 100% of the current hydraulics-based torque requirement, the engine power available to be used by the vehicle's drivetrain 102 may be increased by an amount equal to the amount of engine power currently being consumed by the hydraulic system 130.

For purposes of explanation, a simple example of modifying a baseline torque limit for the engine 104 will now be described in which it is assumed that: (1) the current baseline engine torque limit is set to allow the engine 104 to output 100 horsepower (hp) (e.g., based on the current transmission ratio or the current ground speed of the vehicle 10); (2) the controller 120 is configured to increase the baseline engine torque limit by a torque amount corresponding to 100% of the current hydraulics-based torque requirement; and (3) the work vehicle 10 is configured to separately tow both a first implement that does not include any power-consuming hydraulic components and a second implement that includes hydraulic components that consume 50 hp. Given such assumptions, when the work vehicle 10 is towing the first implement, the baseline engine torque limit of 100 hp may be applied without modification since the current hydraulics-based torque requirement is equal to zero (i.e., due to the first implement not including any power-consuming hydraulic components). In such instance, 100 hp will be available for use by the vehicle's drivetrain 102 in towing the first implement. In contrast, when the work vehicle 10 is towing the second implement, the baseline engine torque limit of 100 hp will be increased by an amount corresponding to the torque required to output the 50 hp being consumed by the hydraulic components of the second implement. In such instance, despite the engine power consumed by the hydraulic components of the second implement, 100 hp will still be available for use by the vehicle's drivetrain in towing the implement, thereby providing the same or similar vehicle performance as that experienced when towing the first implement.

It should be appreciated that, as an alternative to increasing the baseline engine torque limit by an amount equal to a predetermined percentage of the engine torque required to satisfy the current power demands of the hydraulic system 130, the controller 120 may, instead, be configured to increase the baseline engine torque limit by a static or fixed torque value when the current hydraulic power requirement exceeds a predetermined power consumption threshold. For instance, in one embodiment, the predetermined power consumption threshold may correspond to a minimal or de minimus power value such that, when any detectable amount of power is being consumed by the hydraulic system 130, the controller 120 is configured to increase the baseline engine torque limit by the static or fixed torque value. Alternatively, the predetermined power consumption threshold may be set to a higher power value such that the controller 120 is only configured to increase the baseline engine torque limit by the static or fixed torque value when a non-trivial or substantial amount of power being consumed by the hydraulic system 130 (e.g., a power consumption of greater than 5 hp or 10 hp).

Referring now to FIG. 3, a flow diagram of one embodiment of a method 200 for adjusting the torque limits of a work vehicle is illustrated in accordance with aspects of the present subject matter. In general, the method 200 will be described herein with reference to the system 100 described above with reference to FIG. 2. However, it should be appreciated by those of ordinary skill in the art that the disclosed method 200 may be implemented within any other system have any other suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 may include controlling the operation of the engine such that a torque output of the engine is maintained at or below a baseline engine torque limit. For example, as indicated above, the controller 120 may include a plurality of baseline engine torque limits stored within its memory 128, such as a plurality of gear-based and/or speed-based engine torque limits. In several embodiments, the controller 120 may be configured to utilize or apply such baseline engine torque limits for limiting the torque output of the engine 104 when the vehicle's hydraulic system is not consuming power from the engine 104.

Additionally, at (204), the method 200 may include monitoring an operating parameter associated with a current hydraulic power requirement of the hydraulic system of the work vehicle. Specifically, as indicated above, the controller 120 may be communicatively coupled to one or more sensors 152, 156 for monitoring both the fluid pressure and the flow rate of the hydraulic fluid supplied within the hydraulic system 130 via the pump(s) 138. By continuously monitoring such operating parameters, the controller 120 may be configured to determine or calculate the current hydraulic power requirement of the hydraulic system 130 (e.g., using Equation 2 described above).

Further, at (206), the method 200 may include determining an adjusted engine torque limit for the engine based on the current hydraulic power requirement of the hydraulic system. For example, as indicated above, the controller 120 may, in one embodiment, be configured to increase the applicable baseline engine torque limit by a torque amount determined as a function of the engine torque required for satisfying the current hydraulic power requirement of the hydraulic system. Alternatively, the controller 120 may be configured to increase the applicable baseline engine torque limit by a torque amount correspond to a static or fixed torque value.

Referring still to FIG. 3, at (208), the method 200 may include controlling the operation of the engine such that the torque output of the engine is maintained at or below the adjusted engine torque limit. Specifically, once the adjusted engine torque limit is calculated or otherwise determined by the controller 120, the controller 120 may be configured to control the operation of the engine 104 such that the torque output of the engine 104 does not exceed the adjusted engine torque limit. In doing so, since the adjusted engine torque limit corresponds to an increased torque limit over the baseline engine torque limit, the engine power available for use by the vehicle's drivetrain 102 may be similarly increased over what would otherwise be available using the baseline engine torque limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for adjusting torque limits for a work vehicle, the method comprising:
    controlling, with a computing device, an operation of an engine of the work vehicle such that a torque output of the engine is maintained at or below a baseline engine torque limit;
    receiving, with the computing device, an input associated with a current hydraulic power requirement of a hydraulic system of the work vehicle;
    calculating an adjusted engine torque limit by increasing the baseline engine torque limit as a function of a hydraulics-based torque requirement associated with the current hydraulic power requirement of the hydraulic system;
    adjusting, with the computing device, a torque limit for the engine from the baseline engine torque limit to the adjusted engine torque limit based on the current hydraulic power requirement of the hydraulic system; and
    controlling, with the computing device, the operation of the engine such that the torque output of the engine is maintained at or below the adjusted engine torque limit.

2. The method of claim 1, wherein the baseline engine torque limit and the adjusted engine torque limit are both associated with limiting the torque output of the engine while the work vehicle is operating at a given transmission ratio or across a given speed range.

3. The method of claim 1, wherein receiving the input associated with the current hydraulic power requirement comprises monitoring an operating parameter associated with the current hydraulic power requirement of the hydraulic system, the monitoring comprising:
    monitoring a flow rate of hydraulic fluid output from a hydraulic pump of the hydraulic system; and
    monitoring a fluid pressure of the hydraulic fluid output from the hydraulic pump of the hydraulic system.

4. The method of claim 3, further comprising determining a hydraulic power value associated with the current hydraulic power requirement of the hydraulic system based on the monitored flow rate and the monitored fluid pressure of the hydraulic fluid output from the hydraulic pump.

5. The method of claim 1, wherein the baseline engine torque limit is increased by an amount equal to a predetermined percentage of the hydraulics-based torque requirement to calculate the adjusted engine torque limit.

6. The method of claim 5, wherein the predetermined percentage ranges from about 75% of the hydraulics-based torque requirement to about 125% of the hydraulics-based torque requirement.

7. The method of claim 6, wherein the predetermined percentage corresponds to 100% of the hydraulics-based torque requirement.

8. The method of claim 1, wherein the hydraulics-based torque requirement corresponds to a torque value equal to an amount of the torque output of the engine that is consumed by the hydraulic system to satisfy the current hydraulic power requirement.

9. A method for adjusting torque limits for a work vehicle, the method comprising:
    controlling, with a computing device, an operation of an engine of the work vehicle such that a torque output of the engine is maintained at or below a baseline engine torque limit;
    receiving, with the computing device, an input associated with a current hydraulic power requirement of a hydraulic system of the work vehicle;
    calculating an adjusted engine torque limit by increasing the baseline engine torque limit by a fixed torque value when it is determined that the current hydraulic power requirement of the hydraulic system exceeds a predetermined power consumption threshold;
    adjusting, with the computing device, a torque limit for the engine from the baseline engine torque limit to the adjusted engine torque limit based on the current hydraulic power requirement of the hydraulic system; and controlling, with the computing device, the operation of the engine such that the torque output of the engine is maintained at or below the adjusted engine torque limit.

10. A system for adjusting torque limits for a work vehicle, the system comprising:
an engine;
a transmission operatively coupled to the engine;
a hydraulic system including a hydraulic pump, the hydraulic pump configured to supply pressurized hydraulic fluid to one or more auxiliary hydraulic components; and
a controller including a processor and associated memory, the memory storing instructions that, when implemented by the processor, configure the controller to:
control an operation of the engine such that a torque output of the engine is maintained at or below a baseline engine torque limit;
receive an input associated with a current hydraulic power requirement of the hydraulic system;
determine an adjusted engine torque limit by increasing the baseline engine torque limit as a function of a hydraulics-based torque requirement associated with the current hydraulic power requirement of the hydraulic system;
adjust a torque limit for the engine from the baseline engine torque limit to the adjusted engine torque limit based on the current hydraulic power requirement of the hydraulic system; and
control the operation of the engine such that the torque output of the engine is maintained at or below the adjusted engine torque limit.

11. The system of claim 10, wherein the baseline engine torque limit and the adjusted engine torque limit are both associated with limiting the torque output of the engine while the work vehicle is operating at a given transmission ratio or across a given speed range.

12. The system of claim 10, wherein the controller is configured to monitor both a flow rate of the hydraulic fluid output from the hydraulic pump and a fluid pressure of the hydraulic fluid output from the hydraulic pump, the controller being further configured to determine a hydraulic power value associated with the current hydraulic power requirement of the hydraulic system based on the monitored flow rate and the monitored fluid pressure.

13. The system of claim 10, wherein the baseline engine torque limit is increased by an amount equal to a predetermined percentage of the hydraulics-based torque requirement to calculate the adjusted engine torque limit.

14. The system of claim 13, wherein the predetermined percentage ranges from about 75% of the hydraulics-based torque requirement to about 125% of the hydraulics-based torque requirement.

15. The system of claim 14, wherein the predetermined percentage corresponds to 100% of the hydraulics-based torque requirement.

16. The system of claim 14, wherein the hydraulics-based torque requirement corresponds to a torque value equal to an amount of the torque output of the engine that is consumed by the hydraulic system to satisfy the current hydraulic power requirement.

17. A system for adjusting torque limits for a work vehicle, the system comprising:
an engine;
a transmission operatively coupled to the engine;
a hydraulic system including a hydraulic pump, the hydraulic pump configured to supply pressurized hydraulic fluid to one or more auxiliary hydraulic components; and
a controller including a processor and associated memory, the memory storing instructions that, when implemented by the processor, configure the controller to:
control an operation of the engine such that a torque output of the engine is maintained at or below a baseline engine torque limit;
receive an input associated with a current hydraulic power requirement of the hydraulic system;
determine an adjusted engine torque limit by increasing the baseline engine torque limit by a fixed torque value when it is determined that the current hydraulic power requirement of the hydraulic system exceeds a predetermined power consumption threshold;
adjust a torque limit for the engine from the baseline engine torque limit to the adjusted engine torque limit based on the current hydraulic power requirement of the hydraulic system; and
control the operation of the engine such that the torque output of the engine is maintained at or below the adjusted engine torque limit.

* * * * *